April 14, 1970

C. H. WHITMORE

Re. 26,856

FLUID ENERGY TRANSLATING DEVICE

Original Filed Nov. 14, 1966

3 Sheets-Sheet 1

Inventor
Charles H. Whitmore
By [illegible]
Attorney

April 14, 1970

C. H. WHITMORE

Re. 26,856

FLUID ENERGY TRANSLATING DEVICE

Original Filed Nov. 14, 1966

3 Sheets-Sheet 2

Inventor
Charles H. Whitmore
By Dechert Price & Rhoads
Attorneys

FLUID ENERGY TRANSLATING DEVICE
Original Filed Nov. 14, 1966 3 Sheets-Sheet 3
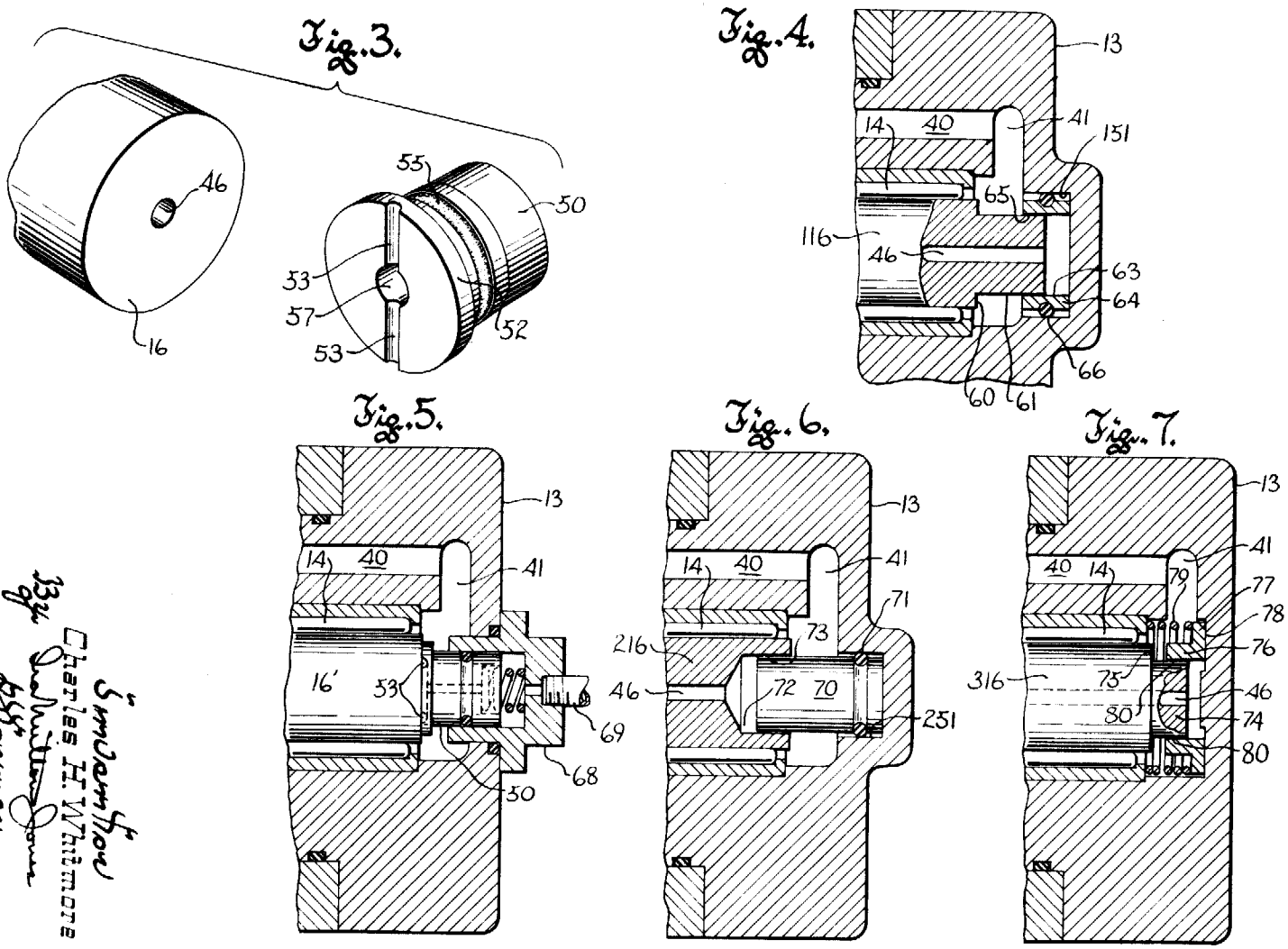
Inventor
Charles H. Whitmore
By his Attorney United States Patent Office Re. 26,856
Reissued Apr. 14, 1970

26,856

FLUID ENERGY TRANSLATING DEVICE

Charles H. Whitmore, Barrington, Ill., assignor to Continental Machines, Inc., Savage, Minn., a corporation of Minnesota Original No. 3,395,643, dated Aug. 6, 1968, Ser. No. 593,893, Nov. 14, 1966. Application for reissue July 23, 1969, Ser. No. 846,991

Int. Cl. F04b *23/04;* F04c *1/00;* F04d *29/66*

U.S. Cl. 418—13 21 Claims

Matter enclosed in heavy brackets [ ] appears in the original patent but forms no part of this reissue specification; matter printed in italics indicates the additions made by reissue.

[This invention relates to variable volume fluid pumps and motors, and more particularly to variable volume pressure compensated two stage pumps of the type wherein pumping is achieved as a consequence of the radial motion of the vanes on a pair of power driven rotors each of which revolves within a cam ring.]

[One of the problems heretofore encountered in pumps of this type was the serious loss of efficiency in the second stage pump, resulting from excessive case drain leakage through the running clearance at opposite sides of its rotor. Leakage, of course, occurs because of the difference in pressure between the high pressure side of the rotor and the case drain leakage path ordinarily provided.]

*This invention relates to rotary hydraulic machines that can be operated either as a pump or a motor, and particularly to variable volume rotary pumps wherein pumping is achieved by the increasing and decreasing volume of sockets between vanes radially slideably seated in slots in the rotor and riding on the inner surface of a ring which eccentrically encircles the rotor and is shiftable to adjust its eccentricity with respect to the rotor and thereby vary the output of the pump. Such pumps are used singly or in two-stage tandem coupled relationship.*

*One of the problems heretofore encountered with rotary hydraulic machines of this type, especially in the case of two-stage pumps, was the serious loss of efficiency resulting from excessive leakage through the running clearance at opposite sides of the rotor and the case drain leakage path ordinarily provided* for lubrication and for cooling of the internal parts of the pump during no flow conditions. Thus, for example, where the output pressures of the first and second stage pumps are 1000 p.s.i. and 2000 p.s.i., respectively, the pressure differential across the areas of case drain leakage in the second stage pump were twice as high as in the first stage pump, and considerably more leakage took place.

However, the problem of leakage in the second stage pump is aggravated by the fact that its output pressure caused a substantial rearward axial thrust to be exerted upon the pump rotor which thrust forced it against the wear plate behind it and reduced clearance there to practically zero while substantially doubling the nominal clearance at the port plate side of the rotor. Since leakage flow is proportional to the cube of the clearance, it can be readily seen that the increased clearance at the port plate side of the rotor, coupled with the high pressure differential across the leakage path, resulted in excessive case drain leakage and low efficiency of the second stage pump.

In general, it is the purpose of this invention to provide a solution to the problem of excessive case drain leakage in a pump of the character described, by an expedient which effects pressurization of a rear chamber in the pump, into which the second stage rotor shaft projects, to a degree such as to reduce by as much as one-half the pressure gradient across the case drain leakage path of which said chamber forms a part, and which expedient also involves translation of the pressure of fluid in said chamber into a thrust on the rear end of the shaft which will be effective to force the second stage rotor toward the port plate at its front in opposition to the rearward thrust exerted on the rotor by high pressure fluid at its port plate side.

In this respect, it is also a purpose of this invention to provide for sealing of said rear chamber by means which allows case drain fluid to flow out of said chamber, and through the second stage shaft for cooling purposes but which meteringly controls such flow to a rate which maintains the desired pressure in the chamber.

With the above and other objects in view which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of physical embodiments of the invention constructed according to the best modes, so far devised for the practical application of the principles thereof, and in which:

FIGURE 3 is an enlarged, fragmentary group perspective view of the rear of the pump shaft and the means for applying forward thrust thereto; and FIGURES 4, 5, 6 and 7 are fragmentary sectional views illustrating modified embodiments of the invention.

Figure 1:
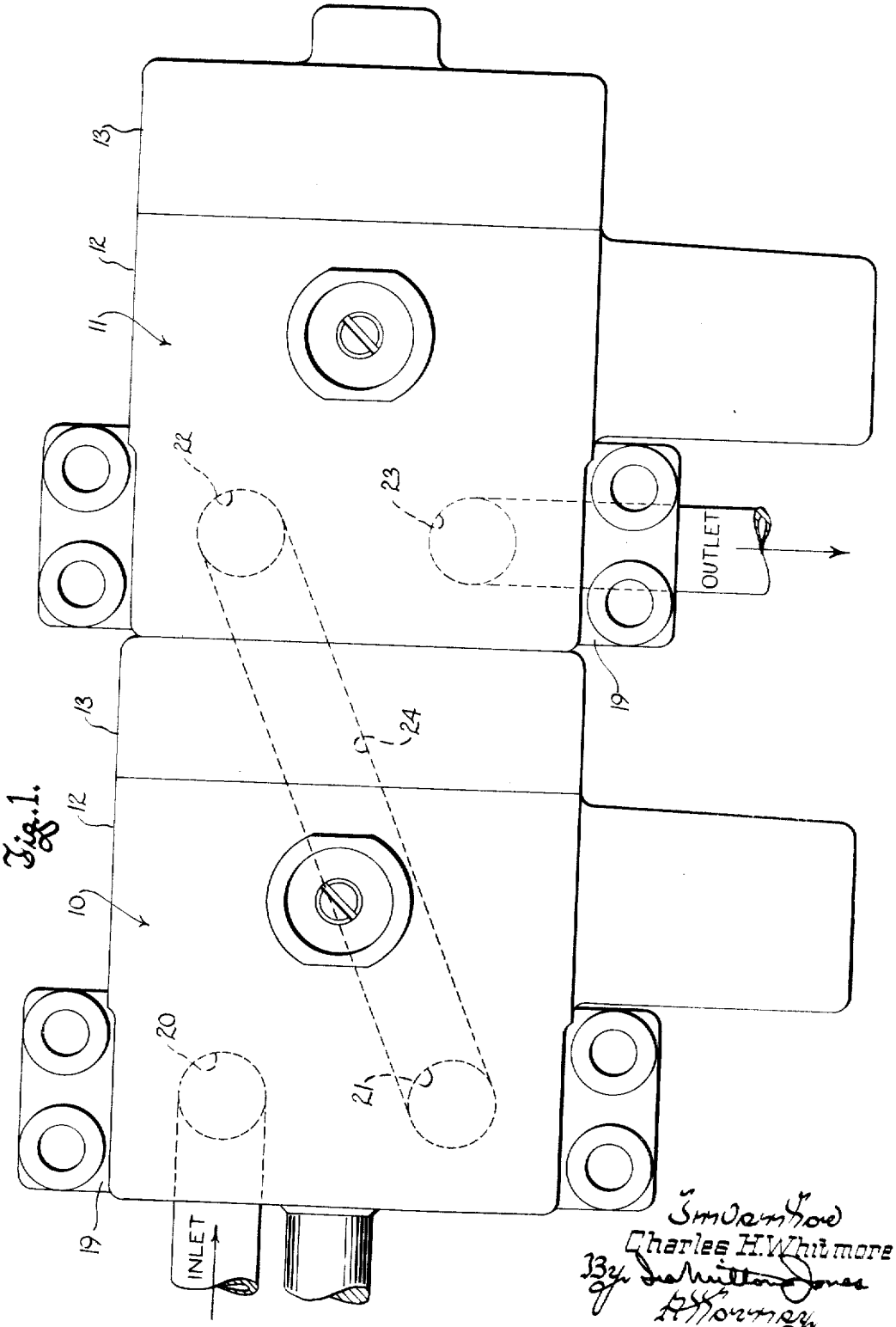
FIGURE 1 is a plan view of a two stage variable volumn pump embodying this invention.
Figure 2:
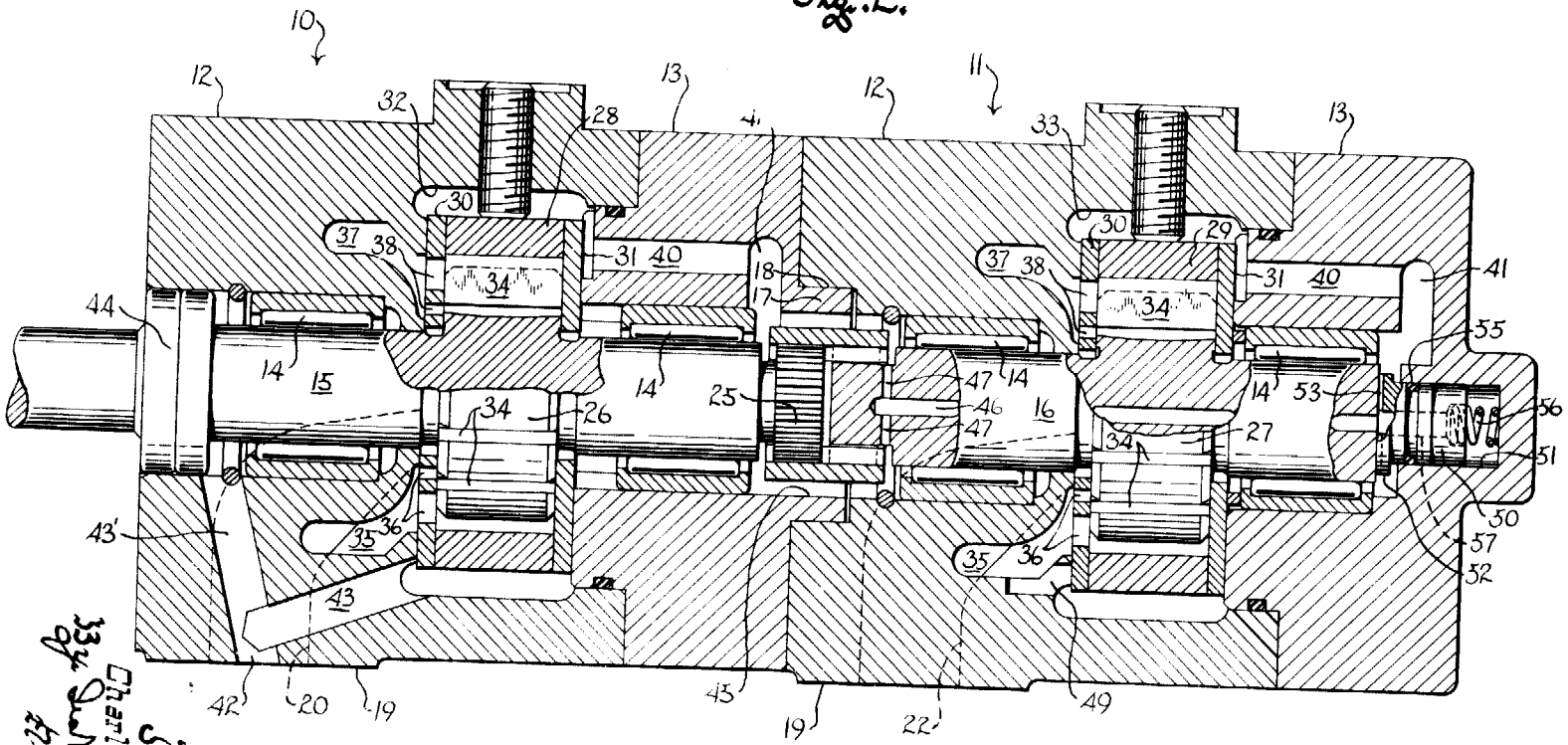
FIGURE 2 is a longitudinal sectional view through the pump of FIGURE 1.

Referring now to the accompanying drawings, the numerals 10 and 11 generally designate the first and second stage pumps, respectively, of a two stage variable volume pressure compensated pump assembly embodying this invention. Each pump is housed within a body comprising a main section 12 and a cover section 13 bolted thereto. Front and rear bearings 14 in the main and cover sections of each body cooperate to rotatably journal the first and second stage pump shafts 15 and 16, respectively, for rotation on a common axis.

The pump bodies are assembled one directly behind the other, with an annular pilot shoulder 17 on the cover 13 of the forward body engaged in a counterbore 18 in the main section of the rear pump body to hold the shafts 15 and 16 coaxial. Any suitable means can be employed to hold the bodies in sealed endwise abutting relation, with their inlets and outlets opening downwardly through mounting bases 19 on the bottoms of their main body sections 12. As seen best in FIGURE 1, the inlet 20 and outlet 21 of the first stage pump 10 are located in the forward part of its main body section 12, and the inlet 22 and outlet 23 of the second stage pump 11 are similarly located in the front part of its main body section. A duct 24 connects the inlet 22 of the second stage pump 11 with the outlet 21 of the first stage pump 10 so that fluid under first stage pump pressure is fed into the second stage pump.

The forward end of the first stage shaft 15 projects from its body for connection with a drive motor, not shown, and its rear end is drivingly connected with the second stage shaft 16 through a splined coupling 25. Consequently, the second stage pump is driven through the first stage pump.

At a location between its bearings 14, each shaft carries a rotor designated 26 in the first stage pump and 27 in the second stage pump. The rotors 26 and 27 are respectively encircled by cam rings 28 and 29, and are closely axially confined between port plates 30 at their front ends and wear plates 31 at their rear ends. The cam rings are located within chambers designated 32 in the first stage pump and 33 in the second stage pump, and each ring is also endwise confined between its adjacent port plate and wear plate.

[Vanes 34 on the rotors engage the inside of the cam rings and are movable radially in slots in the rotor as the latter rotate, an extent depending upon the eccentricity of the cam rings relative to the rotors to effect pumping of fluid from an inlet chamber to an outlet chamber in each pump body. Since the port plates as well as the inlet.] *Vanes 34 radially slidably mounted in slots in the rotors have their outer edges bearing against and riding on the inside surface of the cam rings to coact with the rotors, the cam rings and the port and wear plates to define fluid pockets which increase and decrease in volume an extent depending upon the eccentricity of the cam rings with respect to the rotors. In this manner fluid moves from an inlet chamber to an outlet chamber in each pump body; and if the machine is operated as a pump, fluid from the inlet enters the pockets as they are expanding and is expelled therefrom as the volume of the pockets is reduced. By changing the degree of eccentricity of the cam rings, the fluid volume delivered by the pump can be varied. Since the port plates as well as the inlet* and outlet chambers are the same in both pumps, only those for the second stage pump will be hereinafter referred to, but the same reference numerals apply to like parts of both pumps.

The inlet chamber 35 is located within the bottom portion of the main body section 12, ahead of the rotor. It communicates with the inlet 22 and with the space inside the cam ring through slots 36 in the port plate 30, which slots are elongated and concentric to the rotor axis. The outlet chamber 37 is also located in the main body section 12, but at the side of the rotor shaft opposite the inlet chamber. It is communicated with the outlet 23 and with the space inside the cam ring through slots 38 in the port plate 30, which slots are also elongated and concentric to the rotor axis.

In vane type pumps such as described thus far, it is inevitable that liquid will leak through the running clearance between the rotor and the port plate 30 at the high pressure side of the pump, namely adjacent to the outlet chamber 37. The liquid that leaks past the port plate flows into the chamber 33 around the exterior of the cam ring 29, and is commonly called case drain fluid. It is relied upon to lubricate the bearings 14 and to cool the internal parts of the pump. For that purpose, the chamber 33 forms part of a case drain leakage path that leads rearwardly from the chamber through a passage 40 to an end chamber 41 in the cover section of the pump body.

The chamber 32 of the first stage pump is communicated with a case drain outlet port 42 through a passage 43. A branch passage 43' leads to the passage 43 from a space surrounding the first stage shaft at a location between the front bearing 14 and the shaft seal 44 so that case drain fluid from the high pressure side of the rotor 26 can flow through the front bearing 14 and thence to the case drain port. The cavity in each pump containing its rear bearing 14 opens to the end chamber 41 of the pump to receive fluid from said end chamber.

In addition, the chamber 41 in the cover section of the first stage pump is also communicated with the front bearing cavity in the second stage pump through the bore 45 in the annular pilot shoulder 17, and with the rear chamber 41 of the second stage pump through an axial passage 46 in the shaft 16 of the latter and a cross bore 47 in the forward portion of the second stage shaft. Hence, case drain fluid can flow into the rear bearing cavity of the second stage pump, and through the passages 46 and 47 in the second stage shaft 16 to the rear chamber 41 of the first stage pump for flow to the case drain outlet port via the passage 40 and chamber 32 of the first stage pump.

Prior to this invention, an excessive amount of fluid leaked past the high pressure or port plate side of the second stage rotor 27 and entered a zero pressure case drain leakage path for flow to the case drain outlet, with the result that overall pumping efficiency suffered. This excessive leakage occurred because of the great difference in pressure between the high pressure side of the second stage rotor and the case drain leakage path, and because high pressure output fluid imposed a strong rearward thrust upon the rotor by which it was forced back against its wear plate 31 to reduce clearance there to substantially zero. As a result, all of the running clearance between the second stage rotor and the plates 30 and 31 between which it is confined existed at the port plate or forward side of the rotor. This large front clearance caused undesirably high leakage past the rotor, as can be readily understood when it is appreciated that leakage flow increases in proportion to the cube of the clearance between the second stage rotor 29 and its port plate 30.

This invention provides means for overcoming such excessive leakage past the second stage rotor by causing a forward thrust to be exerted upon the rotor of a value substantially equaling but preferably slightly exceeding the rearward thrust thereon, and by also effecting a great reduction in the pressure gradient across the leakage path leading from the high pressure side of the rotor to the case drain chamber 33.

In order to achieve this objective, the inlet chamber 35 of the second stage pump is communicated by a passage 49 with the case drain chamber 33 so as to allow fluid at a pressure corresponding to the discharge pressure of the first stage pump to enter the upstream portion of the case drain leakage path for the second stage pump. Thus, for example, if the outlet pressure of the first stage pump is 1000 p.s.i. and that of the second stage pump is 2000 p.s.i., fluid at 1000 p.s.i. flows into the case drain chamber 33 and the rear chamber 41 in the second stage pump. However a small amount of fluid sufficient for lubrication and for cooling of the internal parts of the second stage pump is allowed to escape from the upstream portion of the case drain path of which the chambers 33 and 41 form a part, but the escape of such fluid is metered so as to maintain a desirably high pressure in the case drain chamber 33 and a correspondingly lower pressure differential between it and the outlet chamber 37.

The pressure of fluid in the rear chamber 41 of the second stage pump would ordinarily act upon the rear end of the shaft 16 to impose an excessive forward thrust thereon. However, in order to provide for imposing a predetermined forward thrust of lesser magnitude upon the rotor, a fluid pressure responsive shaft masking plunger 50 is axially slidably mounted in a well 51 in the cover section 13 of the second stage pump, with the plunger substantially coaxially abutting and covering a substantial portion of the rear end of the shaft 16. The forward end of the plunger is enlarged by a flange 52 having a rearwardly facing surface upon which pressure fluid in the rear chamber 41 can act to hold the plunger against the rear of the shaft. The plunger also has small grooves 53 across its front face to meter flow of case drain fluid from the rear chamber 41 to the axial passage 46 in the shaft 16. These grooves allow the desired amount of cooling fluid to flow forwardly through the shaft and into the bearing cavity ahead of the forward second stage bearing 14, and maintain the pressure in the chambers 33 and 41 only slightly below that of fluid entering the inlet chamber 35 from the first stage pump. This pressure in the rear chamber 41 acts upon the rear surface of the enlarged front portion 52 of the plunger 50 and upon that surface on the rear of the shaft 16 not covered by the plunger to cause a forward thrust to be exerted upon the shaft 16 and the rotor thereon of a magnitude somewhat greater than the rearward thrust exerted on the rotor by pressure fluid at its output side. Hence the rotor is prevented from moving away from its port plate 30 under the influence of high pressure fluid thereon, and leakage past the opposite sides of the rotor is held to a tolerable amount.

It will be appreciated that to establish the desired amount of forward thrust to be imposed upon the rotor the total area of the exposed rearwardly facing surfaces on the flanged front end portion of the plunger and the rear of the shaft 16 are preselected in accordance with the inlet and outlet pressures of the second stage pump, and also in accordance with the metering grooves in the front face of the plunger, said grooves being of such size as to provide the amount of leakage circulation through the second stage shaft necessary to prevent overheating.

In order that flow through the case drain leakage path leading from the rear chamber 41 of the second stage pump will be controlled solely by the metering grooves 53 in the front face of the piston 50, the piston is encircled by an O-ring seal 55 which bears against the wall of the well 51 in which the piston is mounted to prevent flow of fluid to the axial passage [56] *46* in the shaft in bypass relation to the piston grooves 53. In addition, the piston is yieldingly urged forwardly into engagement with the rear of the second stage shaft 16 by a coiled compression spring 56 in the bottom of the well 51. Also, there is an axial hole 57 through the piston 50, by which the space in the well behind it is vented to the case drain port to assure that the piston will be held against the rear of the second stage shaft under the force exerted on its flange by pressure fluid in the chamber 41.

FIGURES 4 through 7 illustrate other ways in which the desired forward thrust can be imposed upon the shaft and of maintaining pressure in the upstream portion of the case drain leakage path.

In FIGURE 4, for example, the desired forward thrust upon the shaft and rotor of the second stage pump is achieved solely through the action of pressure fluid on a rearwardly facing shoulder 60 on the rear of the shaft 116, which shoulder is located at the base of a reduced integral neck 61 on the shaft, coaxial therewith. The neck 61 projects rearwardly into the bore 63 of a sleeve 64, and the clearance 65 between the sleeve and neck is relied upon to meter the flow of case drain fluid from the rear chamber 41 to the axial passage 46 in the shaft. The sleeve 64 is received within a well 151 in the cover section 13 of the second stage pump, and sealed therein by an O-ring 66 which allows a degree of axial misalignment between the well and the rotor shaft.

The embodiment illustrated in FIGURE 5 is similar to that first described, but provides a bushing 68 which is secured in the rear wall of the cover section 13 of the second stage pump, in which the plunger 50 is received. The space in the bushing behind the plunger 50 is communicated with a case drain duct 69 into which leakage fluid entering the grooves 53 in the flanged front end of the plunger flows. The shaft 16' of the second stage pump has no axial passage in this embodiment of the invention.

The FIGURE 6 embodiment is like that seen in FIGURE 4, except that a solid cylindrical plug 70 is sealed by an O-ring 71 in a well 251 in the cover section 13 and projects forwardly out of the well and into a counterbore 72 in the rear of the second stage pump shaft 216. A small clearance space 73 between the wall of the counterbore and the plug 70 serves to meter the flow of case drain fluid from the pressurized rear chamber 41 to the axial passage 46 in the shaft 216. This construction, like that of FIGURE 4, obviates the need for maintaining exact coaxiality between the shaft 216 and the well 251.

In the embodiment seen in FIGURE 7, the rear of the second stage shaft 316 is reduced to provide a neck 74 which projects rearwardly from a shoulder 75 that provides the sole surface upon which pressurized fluid in the rear chamber 41 exerts forward thrust. The neck 74 is also loosely encircled by a sleeve 76 having a flange 77 on its rear that seats flatwise with a face seal against a forwardly facing machined surface 78 on the cover section 13. A spring 79 confined between the rear bearing 14 and the flange 77 maintains the sleeve in sealing engagement with the cover surface 78, and the clearance space 80 between the bore of the sleeve and the exterior of the neck 74 serves to meter the flow of case drain fluid from the rear chamber to the axial passage 46 in the shaft of the second stage pump.

From the foregoing description, together with the accompanying drawings, it will be readily apparent that this invention provides a novel way of balancing axial thrusts upon the rotor of a pump of the character described, so as to minimize leakage of fluid past the rotor.

What is claimed as my invention is:

1. In a rotary fluid energy translating device having a housing with opposing front and rear interior walls, pressure fluid transfer means in the housing including a rotor confined between said opposing walls, and upon which pressure fluid imposes a rearward thrust during operation of the device, said rotor being carried by a shaft which has front and rear end portions journalled in bearings in the housing, said front wall having a pair of ports through which fluid is delivered to and received from the fluid pressure transfer means, and at one of which ports fluid is under pressure, and means defining a case drain chamber in the housing to receive pressure fluid which leaks through any clearance between the rotor and said front and rear walls of the housing, the combination of:

(A) means communicating said one port with the case drain chamber;

(B) means defining a rear chamber in the housing adjacent to the rear end portion of the shaft and its bearing;

(C) passage means in the housing communicating said rear chamber with the case drain chamber so that the pressure of fluid in said chambers is substantially the same as that at said one port;

(D) exhaust passage means for conducting fluid from said rear chamber;

(E) restriction means to meter the flow of fluid through said exhaust passage means and thereby cause pressure to be maintained in said rear and case drain chambers;

(F) and fluid pressure responsive means connected with the shaft and having a surface upon which pressure fluid in said rear chamber acts to impose upon the shaft and the rotor thereon axial thrust which opposes and is substantially equal to said rearward thrust.

2. The energy translating device of claim 1 wherein said restriction means comprises:

(A) a part on the rear end portion of the shaft having a surface;

(B) and a sealing member supported by a wall of said rear chamber, and having a portion thereof contiguous to said last named surface and coacting therewith to provide an orifice leading from said rear chamber.

3. The energy translating device of claim [1] *2* wherein said last named surface is provided *by* the rear end of the shaft; wherein said sealing member comprises a plug carried by the housing and disposed in said rear chamber, said plug having a surface thereof abutting said end surface on the shaft; and wherein the exhaust passage means leads from the junction of said surfaces of the plug and shaft.

4. The energy translating device of claim 3, wherein one of said abutting surfaces has a groove communicating the rear chamber with said exhaust passage means.

5. The energy translating device of claim 3 further characterized by the plug having limited axial motion with respect to the housing so that it may partake of any endwise movement the rotor shaft may have; and wherein said first named surface comprises a rearwardly facing surface on said plug exposed to the interior of the rear chamber.

6. The energy translating device of claim 1, wherein said first named surface comprises a rearwardly facing surface on the shaft exposed to the interior of said rear chamber.

7. The energy translating device of claim 1, wherein a reduced extremity on the rear end portion of the shaft defines a rearwardly facing shoulder having said first named surface thereon; wherein said restriction means comprises a ring mounted on the rear portion of said reduced extremity of the shaft; wherein the housing has a portion thereof forming an end wall for said rear chamber opposite and spaced from the rear end of the shaft, the ring bearing against the inner face of said end wall; and wherein said exhaust passage means leads from the space inside the ring and between said wall and the rear end of the shaft, the running clearance between the ring and the reduced extremity of the shaft serving to meter the flow of pressure fluid from the rear chamber.

8. In a rotary fluid energy translating device comprising commonly driven first and second stage pumps each having an inlet and a high pressure outlet, a housing with opposing front and rear interior walls, pressure fluid transfer means including a rotor confined between said opposing walls and carried by a shaft which is journalled in the housing, the front interior wall in each housing having ports connecting with the inlet and outlet thereof and through which fluid can be delivered to and received from the fluid pressure transfer means in said housing, and the second stage rotor being subjected to a strong rearward thrust under the force of pressure fluid at its high pressure outlet:

(A) means defining a rear chamber in the second stage pump housing, into which the rear portion of the second stage *rotor* shaft projects;

(B) means by which the inlet of the second stage pump and said rear chamber thereof are communicated with and pressurized by fluid from the outlet of the first stage pump;

(C) means defining a meteringly restricted exhaust passage for conducting fluid from said rear chamber;

(D) and means at the rear of the second stage *rotor* shaft for translating pressure of fluid in said rear chamber into a forward axial thrust upon the second stage shaft and its rotor, of a value substantially equalling said rearward thrust thereon.

9. The rotary fluid energy translating device of claim 8, further characterized by:

(A) means in the housing of the second stage pump defining a case drain chamber surrounding the presure fluid transfer means thereof to receive fluid that leaks through any clearance between the second stage rotor and the opposing front and rear wall between which it is confined;

(B) and passage means communicating said rear chamber with the case drain chamber whereby the pressure in the latter will be maintained by said meteringly restricted exhaust passage at a value substantially equal to the pressure at the second stage inlet, and the tendency for fluid to leak through any clearance between the second stage rotor and its confining front and rear walls will be minimized.

*10. A rotary hydraulic machine operable either as a pump or a motor, having an inlet and an outlet through which fluid enters and leaves the machine, said machine having a housing with a rotor mounted therein by means of a freely journaled shaft to which the rotor is fixed, a portion of the shaft extending rearwardly from the rotor, and from a rotor chamber in which the rotor is located, the rotor chamber being defined in part by front and rear opposing walls between which the rotor is axially confined, fluid being at high pressure in a zone of the rotor chamber during operation of the machine, clearance between the rotor and said opposing walls allowing fluid to escape from the high pressure zone of the rotor chamber into a drain chamber in the housing, the front wall having a pair of ports through which the pressure chamber is communicating with the inlet and outlet of the machine, the fluid at one of said ports being under pressure during operation of the machine and said fluid pressure imposing a strong rearward thrust upon the rotor which tends to increase the clearance between the front wall and the rotor, said machine being characterized by:*

*(A) a rear chamber in the housing of the machine, into which the rearwardly extending portion of the shaft projects;*

*(B) means for supplying the rear chamber with pressurized fluid; and*

*(C) means at said rearwardly extending portion of the rotor shaft for translating pressure of fluid in said rear chamber into a forward axial thrust upon the rotor, through its shaft, of a value substantially equalizing the rearward thrust upon the rotor, whereby excessive clearance between the rotor and the front wall is precluded.*

*11. The rotary hydraulic machine of claim 10, wherein said means for translating fluid pressure in the rear chamber into forward thrust on the rotor produces a forward thrust which slightly exceeds the rearward thrust upon, the rotor.*

*12. The rotary hydraulic machine of claim 10, wherein said means for translating fluid pressure in the rear chamber into forward thrust on the rotor comprises:*

*means at said rearwardly extending portion of the shaft cooperating therewith to define a rearwardly facing annular surface located adjacent to the preiphery of the shaft, and upon whch surface pressure fluid in said rear chamber acts.*

*13. The rotary hydraulic machine of claim 10, further characterized by:*

*(A) exhaust passage means for conducting fluid from said rear chamber; and*

*(B) restriction means to meter the flow of fluid through said exhaust passage means and thereby cause a perdetermined pressure to be maintained in said rotor chamber.*

*14. The rotary hydraulic machine of claim 13, wherein said means for translating fluid pressure in the rear chamber into forward thrust on the rotor comprises:*

*means at said rearwardly extending portion of the shaft cooperating therewith to define a rearwardly facing annular surface located adjacent to the periphery of the shaft, and upon which surface pressure fluid in said rear chamber acts.*

*15. The rotary hydraulic machine of claim 14, wherein said restriction means comprises:*

*(A) a part on the rear end portion of the rotor shaft having a surface; and*

*(B) a sealing member supported by a wall of said rear chamber and having a portion thereof contiguous to said last named surface and coacting therewith to provide an orifice leading from said rear chamber.*

*16. The rotary hydraulic machine of claim 15, wherein:*

*(A) the rear end of the rotor shaft is located in said rear chamber and provides said surface which coacts with the sealing member;*

*(B) wherein the sealing member comprises a plug carried by the housing and disposed in the rear chamber, said plug having a surface thereof abutting said end surface on the rotor shaft; and*

*(C) wherein the exhaust passage means leads from the junction of said surfaces of the plug and shaft.*

*17. The rotary hydraulic machine of claim 16, wherein one of said surfaces has a groove connecting the rear chamber with said exhaust passage means.*

*18. The rotary hydraulic machine of claim 16, further characterized by:*

*(A) a plug having limited axial motion with respect to the housing so that it may partake of any endwise movement the rotor shaft may have; and*

*(B) wherein the plug has a rearwardly facing surface exposed to the pressure of fluid in the interior of the rear chamber so that force derived from pressure fluid in the rear chamber holds the plug in abutting relation to the rear end of the shaft.*

*19. The rotary hydraulic machine of claim 10, further characterized by:*

*(A) said forward axial thrust is imposed upon a rearwardly facing shoulder on the shaft defined by a reduced rear extremity thereon;*

*(B) said restriction means comprising a ring mounted on the rear portion of said reduced extremity of the shaft;*

*(C) the housing having a portion thereof forming an end from the rear chamber opposite and spaced from the rear extremity of the shaft, the ring bearing against the inner face of said end wall; and*

*(D) said exhaust passage means leading from the space inside the ring and between said wall and the rear end of the shaft, the running clearance between the ring and the reduced extremity of the shaft serving to meter the flow of pressure fluid from the rear chamber.*

*20. A two-stage rotary hydraulic machine comprising: commonly driven first and second stage pumps each having an inlet and a high pressure outlet, a housing with a rotor chamber therein partially defined by opposing front and rear interior walls, a rotor in said chamber axially confined between said opposing walls and fixed on a shaft which is journalled in the housing, the front interior wall in each housing having ports connecting with the inlet and outlet of its respective stage through which fluid can be delivered to and received from the rotor chamber, and the rotor therein, and the second stage rotor being subjected to a strong rearward thrust resulting from the force of pressure fluid at its high pressure outlet, said machine being characterized by:*

*(A) means defining a rear chamber in the second stage pump housing, into which the rear portion of the second stage rotor shaft projects;*

*(B) means by which the inlet of the second stage pump and said rear chamber thereof are communicated with and pressurized by fluid from the outlet of the first stage pump;*

*(C) means defining a meteringly restricted exhaust passage for conducting fluid from said rear chamber;*

*(D) and means at the rear of the second stage rotor shaft for translating pressure of fluid in said rear chamber into a forward axial thrust upon the second stage shaft and its rotor, of a value substantially equaling said reraward thrust thereon.*

*21. The two-stage rotary hydraulic machine of claim 20, further characterized by:*

*(A) means in the housing of the second stage pump defining a case drain chamber surrounding the rotor chamber to receive fluid that leaks through any clearance between the second stage rotor and the opposing front and rear walls between which it is confined; and*

*(B) passage means communicating said rear chamber with the case drain chamber whereby the pressure in the latter will be maintained by said meteringly restricted exhaust passage at a value not substantially less than the pressure at the second stage inlet, and the tendency for fluid to leak through any clearance between the second stage rotor and its confining front and rear walls will be minimized.*

References Cited

The following references, cited by the Examiner, are of record in the patented file of this patent or the original patent.

UNITED STATES PATENTS

| | | | |
|---|---|---|---|
| 2,283,131 | 5/1942 | Shaw et al. | 103—112 X |
| 2,406,947 | 9/1946 | Harlamoff | 103—112 |
| 2,835,205 | 5/1958 | Erdmann | 103—112 X |
| 3,220,350 | 11/1965 | White | 103—112 X |
| 3,288,073 | 11/1966 | Pezzillo | 103—112 X |
| 3,291,052 | 12/1966 | Weaver et al. | 103—5 |
| 2,982,223 | 5/1961 | Rosaen | 103—136 |
| 3,086,475 | 4/1963 | Rosaen | 103—136 |
| 3,285,188 | 11/1966 | Kita. | |
| 3,373,692 | 3/1968 | Klessig et al. | 103—136 X |

WILLIAM L. FREEH, Primary Examiner

W. J. KRAUSS, Assistant Examiner

U.S. Cl. X.R.

103—112, 136

UNITED STATES PATENT OFFICE

CERTIFICATE OF CORRECTION

Patent No. Reissue 26,856 Dated April 14, 1970

Inventor(s) C.H. Whitmore

It is certified that error appears in the above-identified patent and that said Letters Patent are hereby corrected as shown below:

Column 1, line 33, "sockets" should read -- pockets --. Column 8, line 16 (Claim 10, (c)), "equalizing" should read -- equaling --. Column 10, line 7 (Claim 20, (d)), rearward is misspelled.

SIGNED AND
SEALED
AUG 25 1970

(SEAL)
Attest:

Edward M. Fletcher, Jr.
Attesting Officer

WILLIAM E. SCHUYLER, JR.
Commissioner of Patents